(12) United States Patent
Okayama et al.

(10) Patent No.: US 7,003,469 B2
(45) Date of Patent: Feb. 21, 2006

(54) AUDIO SIGNAL PROCESSING APPARATUS AND METHOD THEREOF

(75) Inventors: Kazuhito Okayama, Sagamihara (JP); Toshiharu Kuwaoka, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 702 days.

(21) Appl. No.: 09/944,166

(22) Filed: Sep. 4, 2001

(65) Prior Publication Data

US 2002/0029148 A1 Mar. 7, 2002

(30) Foreign Application Priority Data

Sep. 5, 2000 (JP) .............................. 2000-268236
Aug. 31, 2001 (JP) .............................. 2001-262967

(51) Int. Cl.
*G10L 19/00* (2006.01)
(52) U.S. Cl. .................. 704/502; 704/503; 333/14
(58) Field of Classification Search ............. 704/211, 704/220, 251, 502; 333/14; 179/15.55; 381/29; 375/224; 360/2
See application file for complete search history.

(56) References Cited

U.S. PATENT DOCUMENTS

| | | | | |
|---|---|---|---|---|
| 3,795,876 | A * | 3/1974 | Takahashi et al. | 333/14 |
| 4,020,291 | A * | 4/1977 | Kitamura et al. | 704/207 |
| 4,461,022 | A * | 7/1984 | Slagley | 704/205 |
| 5,159,636 | A * | 10/1992 | Rogalski | 704/500 |
| 5,828,994 | A * | 10/1998 | Covell et al. | 704/211 |
| 5,893,068 | A * | 4/1999 | Hasegawa | 704/502 |
| 6,570,722 | B1 * | 5/2003 | Yokozawa et al. | 360/2 |
| 6,717,984 | B1 * | 4/2004 | Hsu | 375/224 |

FOREIGN PATENT DOCUMENTS

| | | |
|---|---|---|
| JP | 11-126097 | 5/1999 |
| JP | 11-144382 | 5/1999 |

OTHER PUBLICATIONS

Ding et al., Determining polarity of speech signals based on gradient of spurious glottal waveforms 1998, IEEE International Conference, pp. 857-560.*

* cited by examiner

*Primary Examiner*—W. R. Young
*Assistant Examiner*—Minerva Rivero
(74) *Attorney, Agent, or Firm*—Louis Woo

(57) ABSTRACT

A digital audio signal to be replayed is processed in a waveform thereof. A frequency bandwidth of the audio signal is expanded through conversion of a sampling frequency, and then the audio signal is low-pass-filtered with a low-pass cut-off frequency corresponding to the converted sampling frequency. An interval of time between two waveform peaks of the audio signal is detected, and then difference data between current data of the audio signal and past data thereof is calculated. The difference data are subject to weighting depending on the interval, and then output data are produced based on both the low-pass-filtered audio signal and the weighted difference data. This processing, which can be realized by activation of software, improves audio quality when compressed audio data is replayed.

13 Claims, 11 Drawing Sheets

ALGORITHM OF DOUBLE-EXTENDED SAMPLING

| INPUT DATA<br>SAMPLED AT RATE = fs | OUTPUT DATA<br>CONVERTED TO RATE=Fs (=2 × fs) |
|---|---|
| m | m |
| m+1 | 0 |
| m+2 | m+1 |
| m+3 | 0 |
| . | m+2 |
| . | 0 |
| . | m+3 |
|  | 0 |
|  | . |
|  | . |
|  | . |

FIG. 4

CORRECTION TABLE A

| Fs2COUNT | 3 (=2Fs) | 4 (=3Fs) | 5 (=4Fs) | 6 (=5Fs) |
|---|---|---|---|---|
| n=1 | 0 | 0 | 0 | 0 |
| n=2 | $1/4(=\alpha)$ | $1/4(=\alpha)$ | $1/4(=\alpha)$ | $1/4(=\alpha)$ |
| n=3 | - | $-1/4(=\beta)$ | 0 | 0 |
| n=4 | - | - | $-1/4(=\beta)$ | 0 |
| n=5 | - | - | - | $-1/4(=\beta)$ |

FIG. 5A

CORRECTION TABLE B

| Fs2COUNT | 3 (=2Fs) | 4 (=3Fs) | 5 (=4Fs) | 6 (=5Fs) |
|---|---|---|---|---|
| n=1 | 0 | 0 | 0 | 0 |
| n=2 | $-1/4(=\beta)$ | $-1/4(=\gamma)$ | $-1/4(=\gamma)$ | $-1/4(=\gamma)$ |
| n=3 | - | $1/4(=\theta)$ | 0 | 0 |
| n=4 | - | - | $1/4(=\theta)$ | 0 |
| n=5 | - | - | - | $1/4(=\theta)$ |

FIG. 5B

OUTPUT LEVELS OF SPECTRUM ANALYZER
[UPPER (ON) : WITH VOICE-QUALITY IMPROVEMENT PROCESSING
LOWER (OFF) : WITHOUT VOICE-QUALITY IMPROVEMENT PROCESSING]

AUDIO SIGNAL PROCESSING APPARATUS AND METHOD THEREOF

BACKGROUND OF THE INVENTION

1. Technical Field of the Invention

The present invention relates to an audio signal processing apparatus and an audio signal processing method for processing of the waveform of a digital audio signal, and in particular, to the processing to improve quality of an audio signal to be replayed.

2. Related Art

Recently, in the field of digital audio, to replay audio signals of music or others recorded in recording mediums including discs, such as CD (Compact Disc) and MD (Mini Disc), and magnetic tapes, has become popular. On the other hand, replaying such audio signals by executing software installed in PCs (Personal Computers) has frequently been carried out as well.

Further, an audio signal compressed with a variety of compression formats, represented by MP3 (MPEG layer 3), is also often replayed with PCs. Such audio signal is also frequently replayed with a portable-dedicated player that has a semiconductor memory of which capacity is relatively small.

In the field of audio other than hi-fi audio, devices, such as cellular phones, PHSs, internet phones, and audio recorders employing semiconductor memories, are used to transmit/receive and replay digital audio signals compressed at lower bit rates.

In cases digital audio data are replayed by various devices, transmitted/received on communication, and stored in memories, reducing the size of data to be handled is of great advantage to cost and applications. It is therefore desired that amounts of data be reduced. Thus, it is normal that compressed digital audio data are stored in memories or transmitted through lines or wireless. Because the compression of the data is forced to cause deterioration of audio quality, it has been demanded to improve the deterioration when being used for hi-fi audio. When taking into account that PCs and portable replaying devices are also used to replay such digital audio signals, processing required to improve audio quality should be limited to processing on software and it is required for the current CPU to perform the processing in real time.

This demand, that is, replaying audio data in excellent audio quality, is raised as well in the field of audio other than hi-fi audio, in which portable devices such as cellular phones are used, particularly when audio data are compressed at lower transfer rates.

SUMMARY OF THE INVENTION

An object of the present invention is to provide an audio signal processing apparatus and an audio signal processing method capable of performing processing for improving audio quality in real time through only processing on software.

In order to achieve the above object, as one aspect of the present invention, there is provided an audio signal processing apparatus in which a digital audio signal to be replayed is processed in a waveform thereof. The apparatus comprises a frequency bandwidth expanding element for expanding a frequency bandwidth of the digital audio signal through conversion of a sampling frequency at which the digital audio signal is sampled; a low-pass filtering element for performing low-pass filtering on the digital audio signal expanded in the frequency bandwidth, the low-pass filtering involving a cut-off frequency corresponding to the converted sampling frequency; a detecting element for detecting an interval of time between two waveform peaks of the low-pass-filtered digital audio signal; a difference data calculating element for calculating difference data between current data of the low-pass-filtered digital audio signal and past data of the low-pass-filtered digital audio signal; a weighting element for weighting the difference data depending on the interval; and a producing element for producing output data based on the low-pass-filtered digital audio signal and the weighted difference data.

The above configuration is able to perform the analysis/prediction processing on, for example, PCM audio data deteriorated by data compression. This processing is therefore able to have the PCM audio data closely restored to original PCM data which were obtained before deterioration, providing higher-quality audio data that have been corrected.

As another aspect of the present invention, there is provided a method of processing a digital audio signal to be replayed in a waveform thereof. The method comprises the steps of expanding a frequency bandwidth of the digital audio signal through conversion of a sampling frequency at which the digital audio signal is sampled; performing low-pass filtering on the digital audio signal expanded in the frequency bandwidth, the low-pass filtering involving a cut-off frequency corresponding to the converted sampling frequency; detecting an interval of time between two waveform peaks of the low-pass-filtered digital audio signal; calculating difference data between current data of the low-pass-filtered digital audio signal and past data of the low-pass-filtered digital audio signal; weighting the difference data depending on the interval; and producing output data based on the low-pass-filtered digital audio signal and the weighted difference data.

This method is capable of providing the same advantage as that gained by the audio signal processing apparatus.

Still, as another aspect of the present invention, a computer-readable program capable of making the computer perform the foregoing processing for the audio quality improvement.

BRIEF DESCRIPTION OF THE DRAWINGS

In the accompanying drawings:

FIG. 4 explains one example of the operation performed by a sampling rate conversion circuit;

FIGS. 5A and 5B are examples showing correction tables;

DETAILED DESCRIPTION OF THE PREFERRED EMBODIMENTS

Embodiments of an audio signal processing apparatus and an audio signal processing method according to the present invention will now be described with reference to the drawings.

First Embodiment

Referring to FIGS. 1 to 9, a first embodiment will now be described.

In this embodiment, an audio signal processing apparatus according to the present invention is realized by a personal computer (hereafter referred to as PC). Hence, the PC operates in cooperation with peripheral equipment connected thereto so as to provide an audio replaying apparatus that receives a digital audio signal, performs audio signal processing according to the present invention on this signal, and replays the processed audio signal. The audio signal processing method of the present invention is therefore realized by performing software installed in the PC. In the following configuration of the apparatus, a portable player is connected with the PC as one piece of the peripheral equipment, so that the portable player alone, not the PC, can execute the audio signal processing according to the present invention.

Figure 1:
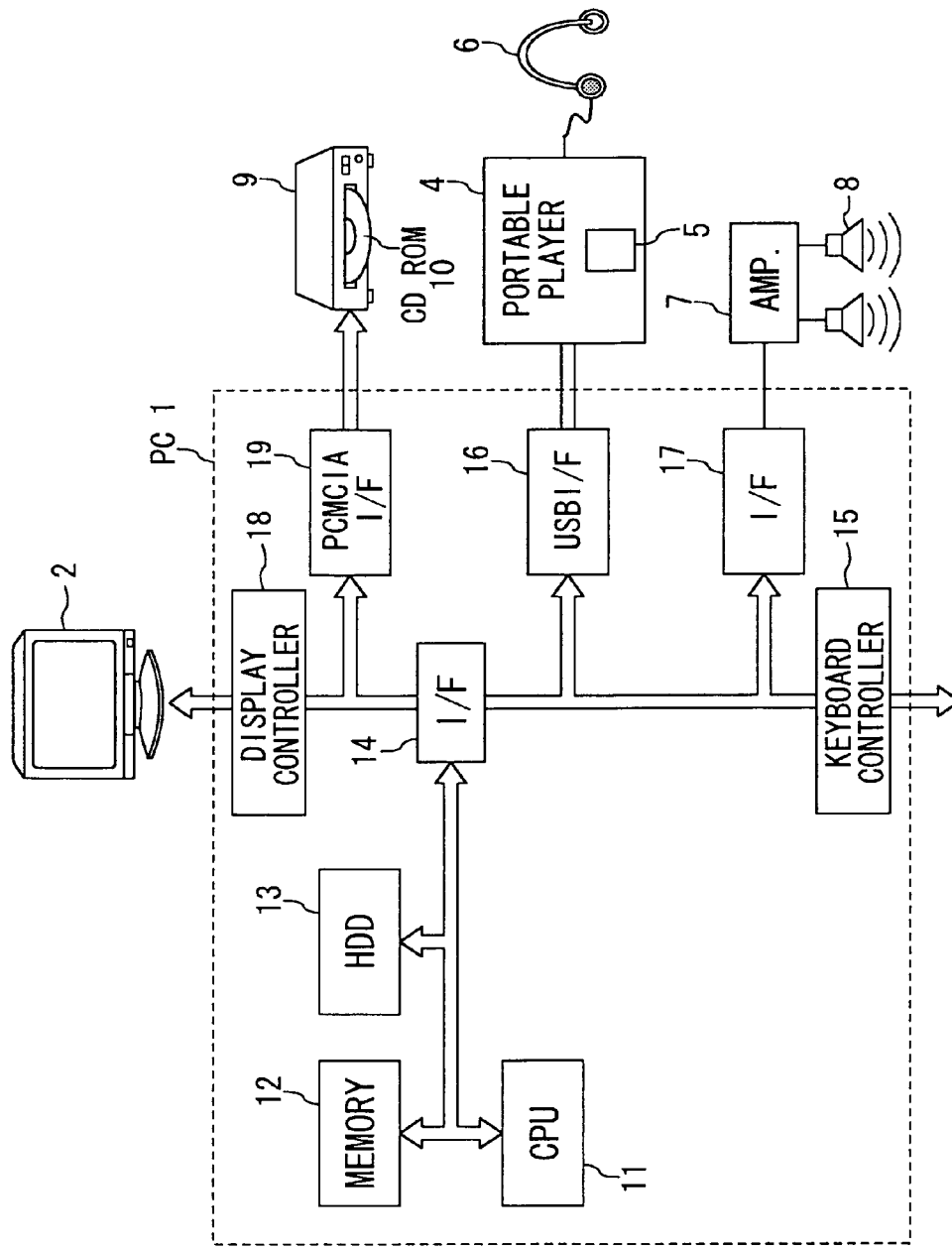
FIG. 1 exemplifies the configuration of an audio replaying apparatus according to a first embodiment of the present invention, the audio replaying apparatus functionally including an audio signal processing apparatus according to the present invention.

FIG. 1 shows an audio replaying apparatus consisting of the PC and its peripheral equipment. At first, this apparatus will now be described in terms of its internal connections.

The audio replaying apparatus is provided with a PC 1 and pieces of peripheral equipment connected to the PC 1, such as a display 2, keyboard 3, portable player 4 (in which a semiconductor memory 5 is incorporated), amplifier 7, and CD-ROM (Compact Disc Read Only Memory) drive 9.

The portable player 4 is also connected to headphones 6. The amplifier 7 is also connected to speakers 8. A CD-ROM 10 serving as a recording medium can be loaded into the CD-ROM drive 9.

As shown in FIG. 1, the PC 1 has a CPU (Central Processing Unit) 11 that is in charge of calculation and processing based on a predetermined program. The CPU 11 is coupled through a bus with a memory 12 (including a ROM and a RAM), HDD (Hard Disc Drive) 13, and an interface (I/F) 14. This interface 14 is connected via another bus to a keyboard controller 15, USB (Universal Serial Bus) I/F 16, and audio output I/F 17. Of these, the keyboard controller 15 is connected to the keyboard 3, while both of the USB I/F 16 (parallel I/F, serial I/F, or others) and the audio output I/F 17 are connected to the forgoing portable player 4 and amplifier 7, respectively. The keyboard 3 is used as an input device to be operated by an operator, but this keyboard 3 may be replaced by a touch panel. In that case, the keyboard controller 15 is replaced by a touch panel controller, correspondingly to such use.

The interface 14 is further connected via another bus to a display controller 18 and a PCMCIA (Personal Computer Memory Card International Association) I/F 19. Of these, the display controller 18 is connected with the display 2, whilst the PCMCIA I/F 19 is connected to the CD-ROM drive 9.

Alternatively, in place of the CD-ROM drive 9, connectable to the PCMCIA I/F 19 are drives capable of reading data from recording mediums, such as CD-RW, DVD-ROM, DVD-RAM, DVD-RW, or MO. This makes it possible to use recording mediums including CD-RW, DVD-ROM, DVD-RAM, DVD-RW, and MO, instead of the CD-ROM 10. Additionally, to the PCMCIA I/F 19, a flash memory drive, radio I/F card, or modem card may be connected.

Accordingly, audio data recorded in the format of PCM or MP3 in the CD-ROM 10 are read from the CD-ROM drive 9, and then temporarily or directly stored in the HDD 13 as a WAVE file or a MP3 file. This stored file is converted into an analog signal by the audio output I/F 17, before being sent to the amplifier 7. The analog signal is then amplified by the amplifier 7, so that it is outputted from the speakers 8 as a sound (a voice). Alternatively, the audio data stored in the HDD 13 may be obtained through a network such as Internet.

On the other hand, in the portable player 4 connected to the USB I/F 16, the semiconductor memory 5 is fixedly or detachably loaded. It is therefore possible that audio data stored as the MP3 file in the HDD 13 or others of the PC1 are transferred to the semiconductor memory 5 of the portable player 4. The transferred audio data can therefore be replayed by the portable player 4. Although not shown, the portable player 4 has a CPU and a ROM in which a replay program for audio data such as MP3, which allows the audio data recorded in the semiconductor memory 5 to be replayed. Normally, audio data stored in the portable player 4 are replayed through the headphones 6.

In cases the semiconductor memory 5 can detachably be loaded into the portable player 4, the semiconductor memory 5 can be loaded directly into a semiconductor memory drive (not shown) incorporated in the PC 1. In this configuration, audio data can be transferred to the semiconductor memory 5 through this drive. In this case, further, the semiconductor memory 5 can be loaded into the portable player 4 to replay voices. Still, in the case that the portable player 4 is configured recordably, it may replay recorded audio data, without being connected to the PC1.

Figure 2:
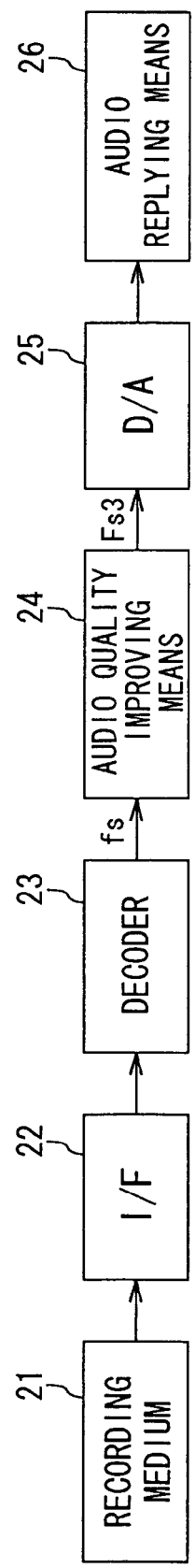
FIG. 2 exemplifies the configuration of a replay system incorporated in the audio replaying apparatus according to the first embodiment.

In the PC 1 or portable player 4 thus-constructed, audio data are replayed based on means shown in FIG. 2. As shown in FIG. 2, audio data, which are recorded in the recording medium 21, such as the HDD 13, CD-ROM 10 (alternatively CD-RW, DVD-ROM, DVD-RAM, DVD-RW, MO, or others), or semiconductor 5, are read out by the CPU 11 of the PC1 or the CPU of the portable player 4 through an interface 22 (representing the interfaces 14, 16, and 19 of the PC1 or interfaces of the portable player 4) of the PC1 or portable player 4. When the audio data that have been read out are compressed, as the MP3 file, the CPU 11 of the PC 1 or the CPU of the portable player 4 functionally provides a decoder 23. This decoder 23 decodes the compressed audio data into decoded PCM data, which are then sent to audio quality improving means 24 that is an essential part of the present invention. In this means 24, the PCM data are subjected to processing for audio quality improvement. The quality-improved audio data are then converted into an analog signal by a D/A converter 25 (incorporated in the audio output I/F 17 of the PC1 or in the portable player 4). The thus-converted analog audio signal is sent to an audio replaying means 26 to be replayed. Practically, the analog signal is sent to the speakers 8 via the amplifier 7 or to the headphones 6 via a not-shown amplifier in the portable player 4.

The audio quality improving means 24 will now be described in detail in a practical improvement method with reference to FIG. 3. Incidentally, this audio quality improving means 24 is functionally realized by the CPU 11 based on a program stored in the HDD 13 or the semiconductor memory (RAM) 5. The CPU 11 is for example a 32-bit RISC processor of which operation frequency is 130 MHz. The processing program is made such that the processor is able to output processed results in real time. Further, during the processing, inputted waveform data, various flags necessary for the processing, data such as counts can be temporarily memorized by the memory (RAM) 12.

Figure 3:
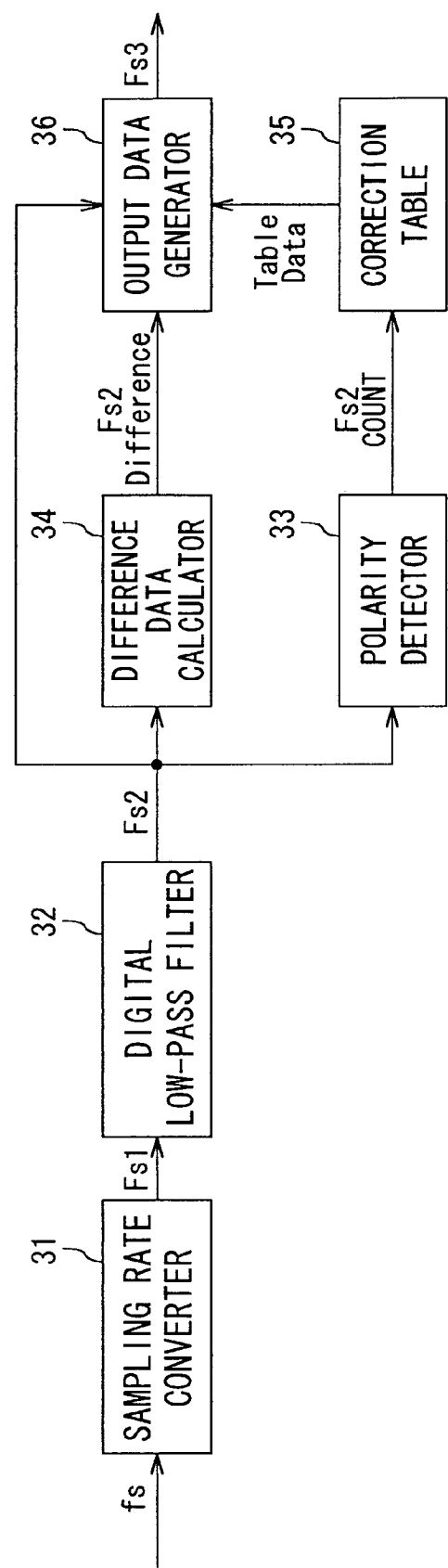
FIG. 3 is a block diagram explaining audio signal processing for improved audio quality, which is carried out in the first embodiment.

As shown in FIG. 3, the audio quality improving means 24 functionally includes a sampling rate converter 31 serving as converting means, digital low-pass filter 32, polarity detector 33, difference data calculator 34 serving as difference data calculating means, correction table 35, and output data generator 36.

Because the decoder 23 (shown in FIG. 2) outputs linear PCM data sampled at a sampling frequency fs. This PCM data are provided to the audio quality improving means 24, in which the data are first sent to the sampling rate converter 31. This sampling rate converter 31 converts the inputted linear PCM data into PCM data Fs1 sampled at a sampling frequency Fs (=2fs), which is double the sampling frequency fs of the original inputted linear PCM data, as shown in FIG. 4. In the example of FIG. 4, the values of data added by the double sampling are all set to zero, thus being "m, 0, m+1, 0, m+2, 0, . . . " (m: PCM data). Alternatively, the same PCM data may be repeated every data so as to be "m, m, m+1, m+1, m+2, m+2, . . . " or an intermediate data individually obtained between each data and the next data is inserted between PCM data. Alternatively, the converted sampling rate is not limited to double, and it can for example be four times, or other times.

The PCM data Fs1 are then provided to the digital low-pass filter 32, in which the data is low-pass-filtered at a cut-off frequency (Rate) Fs/4 to remove higher-frequency signal components of the data including folded noise (ailiasing), thereby providing only the original signal components as output data Fs2 sampled at an extraction sampling frequency Fs. By the way, if the four-times over-sampling is done by the sampling rate converter 31, the cut-off frequency (Rate) given to the low-pass filter 32 is specified as being Fs/4.

The output data Fs2 that have been extracted as the original signal components are then provided to the polarity detector 33. This detector 33 monitors the waveform of the output data Fs2, which is graphed with time in the lateral axis and audio amplitude in the longitudinal axis, during which time it calculates a count showing how many times an interval of time between polarity-inverted two peaks of the waveform is larger than a sampling period corresponding to the sampling frequency Fs and generates its count Fs2COUNT.

The output data Fs2 are also provided to the difference data calculator 34, in which a difference between the current data Fs2 and the last data Fs2' before one period of Fs is calculated, being provided as Fs2Difference. The difference data calculator 34 has a function to hold one or more sampling data, so that the current data Fs2 can be subtracted from the last sampling data Fs2' that have been held. The resultant difference data Fs2Difference are outputted as information indicating a difference in amplitude of audio.

The count Fs2COUNT provided by the polarity detector 33 is given to a correction table 35 pictorially shown in FIGS. 5A and 5B, in which correction coefficients TableData are read out correspondingly to the given count Fs2COUNT. The correction coefficients TableData are used as a value for weighting done differently according to the interval of time between polarity-inverted two peaks shown by the Fs2COUNT.

Supplied to the output data generator 36 are, therefore, the output data Fs2, difference data Fs2Difference outputted from the difference data calculator 34, and correction coefficients TableData outputted from the correction table 35. The output data generator 36 adds weighted difference data to the original signal components Fs2, thus producing a corrected PCM signal Fs3 over an expanded frequency bandwidth. This operation can be expressed by the following formula (1):

$$Fs3=Fs2+(Fs2\text{Difference} \times \text{TableData}) \quad (1).$$

The sampling frequency for this PCM data Fs3 is Fs (=2fs), with the result that the D/A converter 25 provides an analog signal of which frequency bandwidth is double expanded, thus providing the analog signal of higher quality in audio.

Referring now to flowcharts shown in FIGS. 6 and 7, how to process audio carried out by the foregoing audio processing apparatus will be described in detail, especially relating to the operation of the audio quality improving means 24 serving as the essential part of the process.

Figure 6:
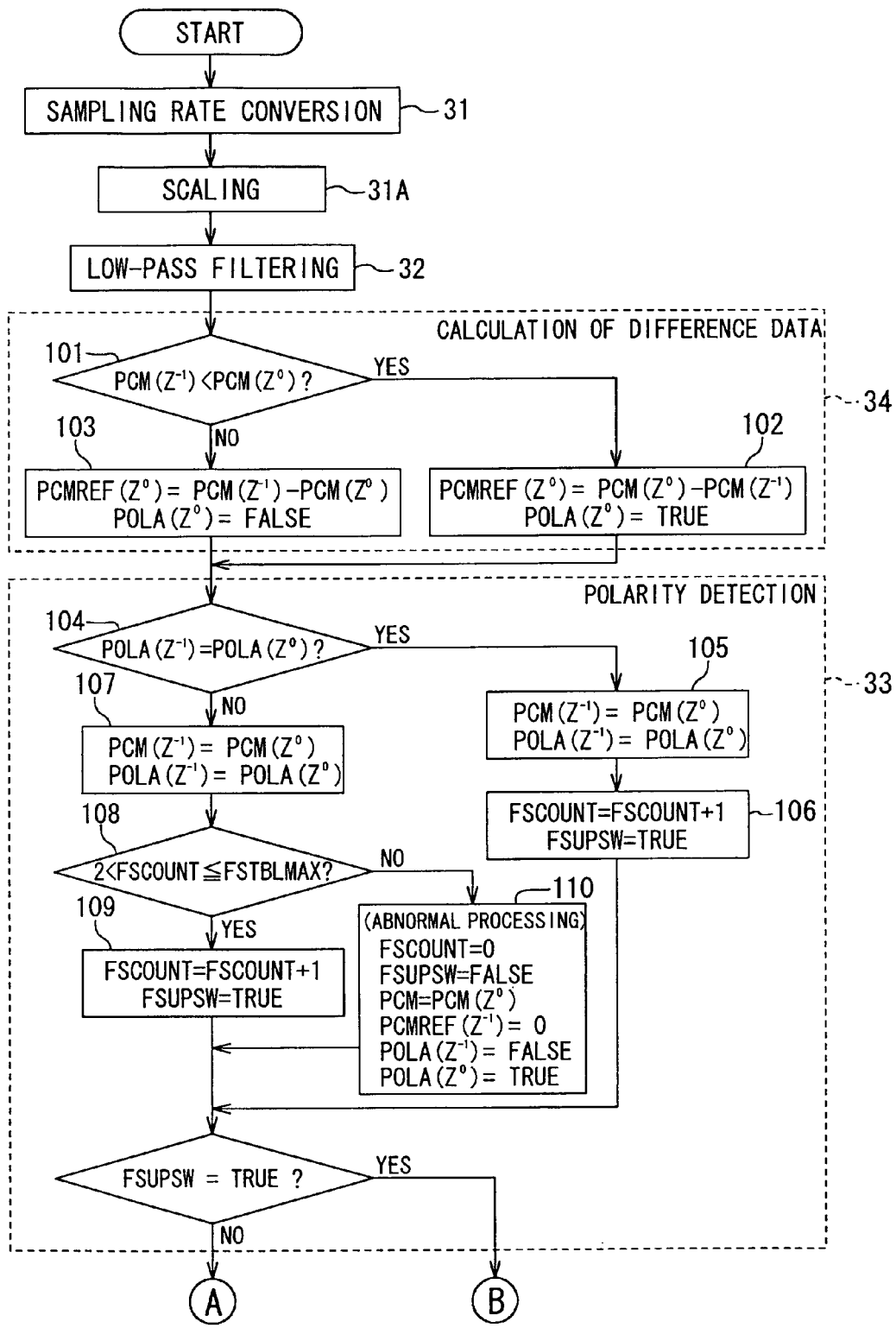
FIG. 6 is a flowchart showing in part one example of the audio signal processing performed in the first embodiment.

In the flowchart shown in FIG. 6, linear PCM data outputted from the decoder 23, which are sampled at the frequency fs, are supplied to the sampling rate converter 31 of the audio quality improving means 24. The sampling rate converter 31 converts the inputted linear PCM data of which sampling frequency is fs, to PCM data Fs1 of which sampling frequency is Fs (=2fs) that is double fs, as illustrated in FIG. 4. The converted PCM data Fs1 are then subject to scaling carried out a scaling processor 31A functionally realized by an operation of the CPU 11, and then supplied to the digital low-pass filter 32. In this filter 32, the PCM data Fs1 is low-pass-filtered with a cut-off frequency (Rate) of Fs/4, so that higher frequency signal components including folded noise of the data are removed, leaving only original signal components extracted at the sampling frequency Fs. The extracted original signal components are thus supplied, as output data Fs2, to the difference data calculator 34.

As shown in FIG. 6, in the difference data calculator 34, the supplied current data $Fs2=PCM(Z^0)$ is compared with the data $Fs2=PCM(Z^{-1})$ acquired at the last sampling (step 101). If the supplied current data $PCM(Z^0)$ is larger in amplitude than the last data $PCM(Z^{-1})$ (YES at step 101), this determination exhibits that the waveform currently under sampling is on the increase. Therefore, in this case, the last sampled data $PCM(Z^{-1})$ is subtracted from the current data $PCM(Z^0)$, thus difference data $PCMREF(Z^0)$, which was noted as the reference Fs2Difference in the foregoing formula (1), being obtained, and a flag TRUE indicative of the increase of the data is set to polarity data $POLA(Z^0)$ (step 102). On the other hand, the supplied current data $PCM(Z^0)$ is smaller in amplitude than the last data $PCM(Z^{-1})$ (NO at step 101), this determination exhibits that the waveform currently under sampling is on the decrease. Therefore, in this case, the current data $PCM(Z^0)$ is subtracted from the last sampled data $PCM(Z^{-1})$, thus difference data $PCMREF(Z^0)$, which was noted as the reference Fs2Difference in the foregoing formula (1), being obtained, and a flag FALSE indicative of the decrease of the data is set to polarity data POLA($Z^0$) (step 103).

In the polarity detector 33, comparison is made between the last sampled polarity data PCM($Z^{-1}$) and the currently sampled polarity data POLA($Z^0$) to determine whether or not the polarity of the current PCM data has been changed from that of the PCM data sampled last time (step 104). In cases the polarity data show the same flag, so the polarity has been unchanged yet (YES at step 104), the waveform of the PCM data merely changes in amplitude in the same gradient direction. Thus, the data PCM($Z^0$) and the polarity data POLA($Z^0$) are stored for the processing that will be carried out when sampled next time (step 105). Then, a value of 1 is added to an interval between peaks of the waveform, referred to as a waveform peak interval FSCOUNT, which was noted as the reference Fs2COUNT in the foregoing formula (1), counted by the number of times of sampling and an on/off flag FSUPSW for the output data generator 36 is set to be off (FALSE) (step 106).

Meanwhile, in cases the polarity data show the different flags from each other, so the polarity has been changed (NO at step 104), the waveform of the PCM data changes in amplitude from one different gradient direction to the other one, and vice versa. Thus, the data PCM($Z^0$) and the polarity data POLA($Z^0$) are stored for the processing that will be carried out when sampled next time (step 107). It is then determined if or not the waveform peak interval FSCOUNT has been more than a maximum value of Fs that can be processed in real time. To be specific, it is determined whether or not the value of the waveform peak interval FSCOUNT is larger than 2 but smaller than a maximum value of Fs (abbreviated as FSTBLMAX) that can be processed in real time (step 108). If the value of the waveform peak interval FSCOUNT remains within such range (YES at step 108), the wave peak interval FSCOUNT is incremented and the on/off flag FSUPSW for the output data generator 36 is turned on (TRUE) (step 109). In contrast, the waveform peak interval FSCOUNT shows a value that exists outside such range (NO at step 108), abnormal processing is done in such a manner that various values are initialized and the on/off flag FSUPSW is turned off (FALSE) (step 110). It is then determined if the on/off flag FSUPSW is TRUE or not (step 111). If the flag FSUPSW is TRUE (YES at step 111), the processing in the CPU 11 is routed to that for the output data generator 36 (refer to references B in FIGS. 6 and 7). By contrast, when the flag FSUPSW is FALSE (NO at step 111), the processing directed to the output data generator 36 is skipped (refer to references A in FIGS. 6 and 7).

Figure 7:
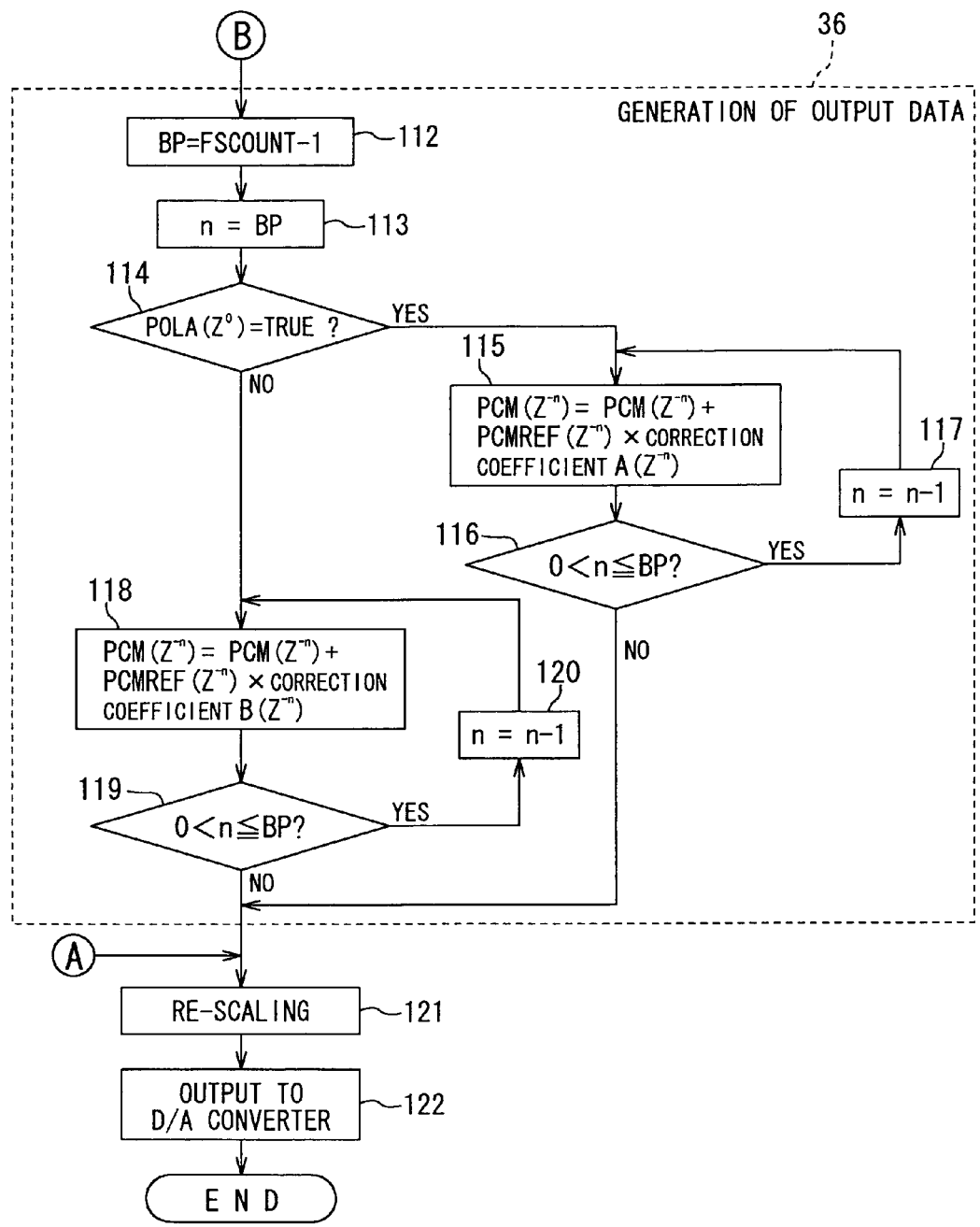
FIG. 7 is a flowchart showing the remaining part of the audio signal processing performed in the first embodiment.

In the flowchart shown in FIG. 7, mainly performed is processing directed to the output data generator 36, in which the value of the waveform peak interval FSCOUNT is decremented and its decremented value is set to a variable BP (step 112). Then the value of the variable BP is replaced by a further variable n (step 113). Both values of the variables BP and n agree with the number of times of sampling carried out during the two detected peaks of the data waveform.

It is then determined whether or not the polarity data POLA($Z^0$) is TRUE showing that the waveform now under sampling is on the increase (step 114). In cases the polarity data POLA($Z^0$) is TRUE (YES at step 114), the correction table A shown in FIG. 5A is used. Practically, the correction table A is made reference with the value of the n showing the sampling position of sampled PCM data and the value of the waveform peak interval FSCOUNT, so that a corresponding value to the reference in the correction table A is extracted as a correction coefficient A($Z^{-n}$) noted as the reference TableDate in the foregoing formula (1). The difference data PCMREF($Z^{-n}$) is then multiplied by the correction coefficient A($Z^{-n}$) to figure out a correction value. This correction value is then added to an n-th sampled data PCM($Z^{-n}$) to output it as corrected output data (step 115). And as the value of the n is decremented, the above correction is repeated until the value of the n reaches zero (n=0), so that the corrected output data are obtained whenever the correction is made (steps 116 and 117).

On the other hand, in cases the polarity data POLA($Z^0$) is FALSE showing that the waveform now under sampling is on the decrease (NO at step 114), the correction table B shown in FIG. 5B is used. Practically, the correction table B is made reference with the value of the n showing the sampling position of sampled PCM data and the value of the waveform peak interval FSCOUNT, so that a corresponding value to the reference in the correction table B is extracted as a correction coefficient B($Z^{-n}$) noted as the reference TableDate in the foregoing formula (1). The difference data PCMREF($Z^{-n}$) is then multiplied by the correction coefficient B($Z^{-n}$) to figure out a correction value. This correction value is then added to an n-th sampled data PCM($Z^{-n}$) to output it as corrected output data (step 118). And as the value of the n is decremented, the above correction is repeated until the value of the n reaches zero (n=0), so that the corrected output data are obtained whenever the correction is made (steps 119 and 120).

When the condition of n=0 is realized at step 116 or 119, the processing in the output data generator 36 is ended. The corrected output data obtained from the generator 36 is re-scaled, before being sent to the D/A converter 25 (steps 121 and 122).

Figure 8:
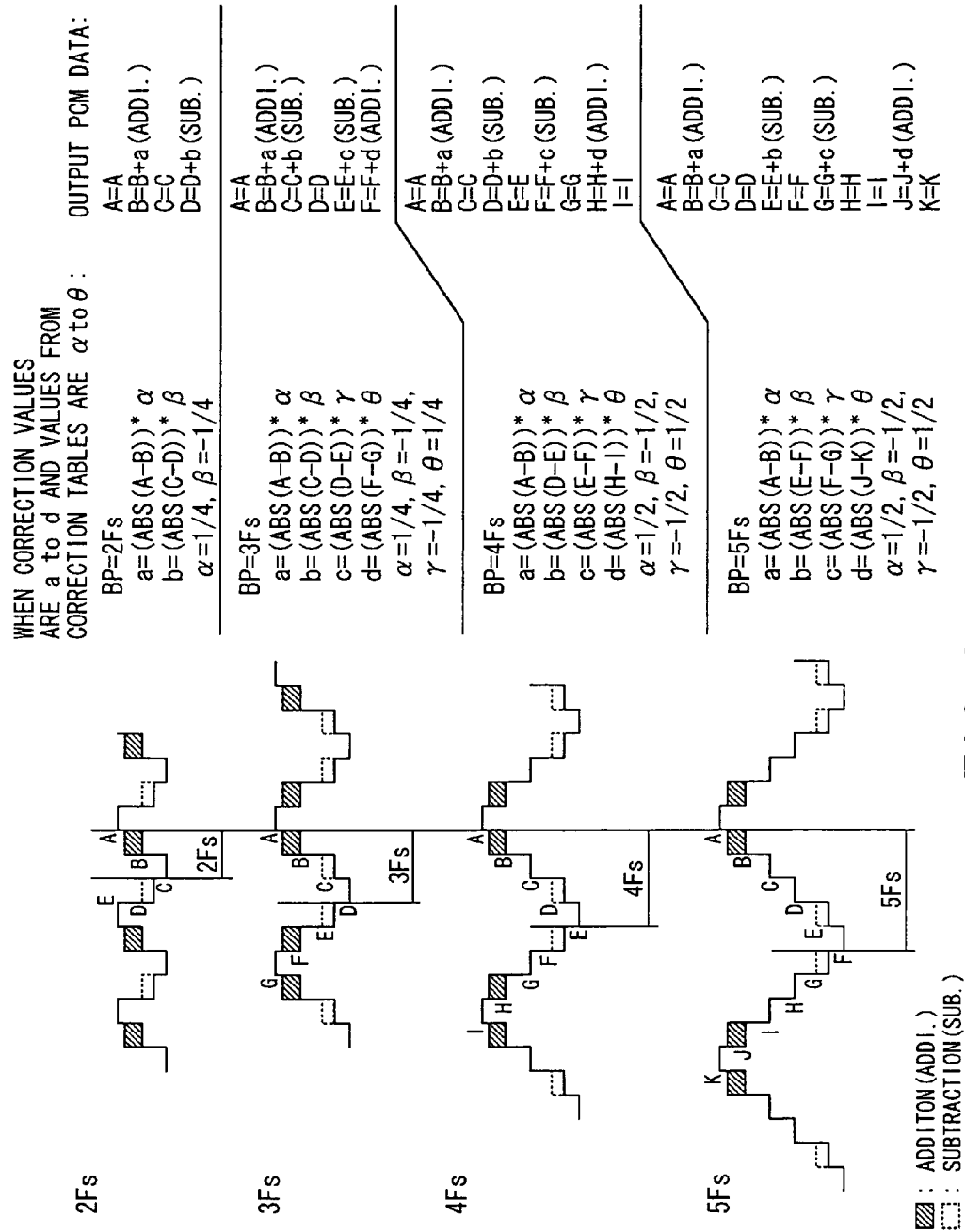
FIG. 8 explains a waveform conversion algorithm adopted by the audio signal processing performed in the first embodiment.

A practical example obtained by correcting audio data according to the foregoing principle will now be described using FIG. 8. In FIG. 8, for each of the cases that the wave peak interval is 3 to 6 (i.e., 2Fs to 5Fs), the waveform of data, corrected locations of each waveform, their correction values (a to d), correction coefficients $\alpha$ to $\theta$, and its corrected waveform are exemplified.

When taking as an example the waveform of which waveform peak interval of 3 (i.e., 2Fs), the correction table A is used during the waveform is on the increase. The waveform peak interval is counted in the order of C, B to A during the waveform is on the increase, thus FSCOUNT being 3. Additionally, $$n = BP = FSCOUNT - 1 = 2$$

is established. When n=2 and the waveform peak interval=3, a coefficient shown by the correction table A is ¼ (=$\alpha$) (refer to FIG. 5A). The correction value for the waveform data B is expressed by $$a = ABS(A-B) \times \alpha,$$

as shown in FIG. 8, thus the waveform data B is corrected to "B+a." As a result, the output PCM data becomes "B+a." Since n=1 and the waveform peak interval=3, the correction table A shows that a correction coefficient is zero. Thus, the correction value is zero for the waveform data C, resulting in that its output PCM data is kept at C itself, with no correction. In the similar way to the above, the correction table B is used when the data waveform is on the decrease. The waveform peak interval is counted in the order of E, D to C during the waveform is on the decrease, thus FSCOUNT being 3, then an expression of $$n=BP=FSCOUNT-1=2$$

is established. When n=2 and the waveform peak interval=3, a coefficient shown by the correction table B is $-\frac{1}{4}$ (=β) (refer to FIG. 5B). The correction value for the waveform data D is expressed by an expression of $$b=ABS(C-D)\times\beta,$$

as shown in FIG. 8, thus the waveform data D is corrected to "D+b." As a result, the output PCM data becomes "D+b." Because the coefficient obtained from the correction table B is $-\frac{1}{4}$, actually performed is the subtraction of the coefficient from the PCM waveform data D in order to obtain the output PCM data. Since n=1 and the waveform peak interval=3, the correction table B shows that a correction coefficient is zero. Thus, the correction value is zero for the waveform data E (A), resulting in that its output PCM data is kept at E (A) itself, with no correction.

Similarly, the calculation of the FSCOUNT enables the waveform peak interval to be detected. The FSCOUNT and the value of n corresponding to the calculated FSCOUNT are then applied to the correction table A (when the waveform is on the increase) or B (when the waveform is on the decrease) to obtain a correction coefficient. The correction coefficient is used, together with a difference between adjacently sampled waveform's amplitudes, for correcting the waveform data, with the result that the voice is greatly improved in quality.

The above embodiment is configured on the concept that a 32-bit RISC processor used as the CPU and the processor processes the above correction in real time. Thus, use of higher-speed CPUs makes it possible to obtain the FSCOUNT of higher orders or to calculate the correction value derived from correction coefficients with decimals of a larger number of digits. This will provide higher quality of audio data. In the case that a condition of FSCOUNT=7 (i.e., 6Fs) is established, waveform data to be corrected are increased by one in each of the increased and decreased wave forms, compared to the case of 5Fs, so that data used for the correction is raised by one for each direction.

The audio quality improving means 24 is designed to perform the analysis/prediction processing, as described above, on PCM audio data deteriorated by data compression. This processing is therefore able to have the PCM audio data closely restored to original PCM data gained before deterioration, providing higher-quality audio data that has been corrected.

Figure 9:
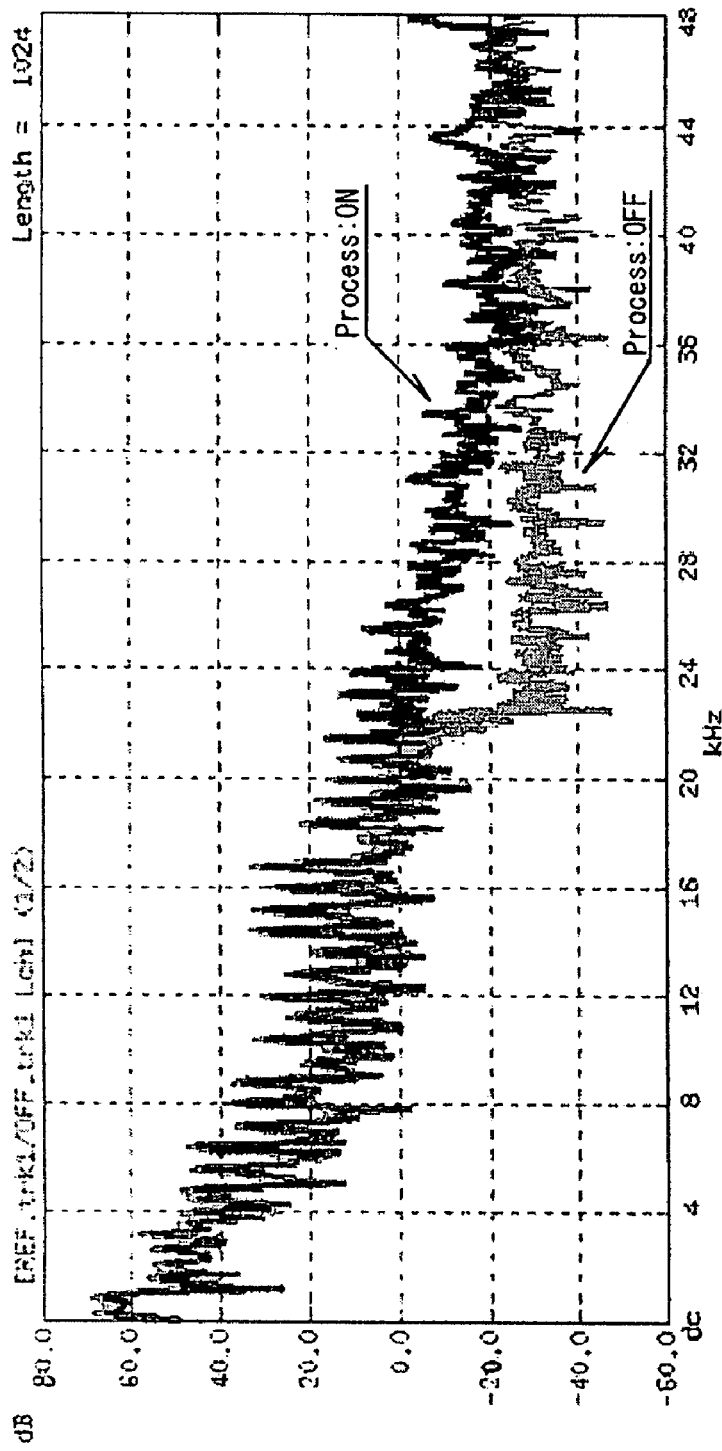
FIG. 9 comparatively shows two output graphs from a spectrum analyzer, which illustrates an advantage of improvement in audio quality provided by the present invention.

FIG. 9 shows comparative examples conducted by the present inventors. The graphs shown therein, in which the horizontal axis represents frequencies and the vertical axis represents signal levels, are waveforms of outputs from a spectrum analyzer. The graphs comparatively show an effect of the audio quality improvement according to the present invention, in which the upper graph was obtained with the audio quality improving processing (ON), while the lower graph with no audio quality improving processing (OFF). The graphs clearly exhibit, in particular, a remarkable advantage of improvement of audio quality in a higher frequency region more than about 20 kHz, thanks to the audio quality improving processing. Increased signal levels than being with no such processing show such advantage.

In the forgoing embodiment, the processing has been described block by block, but this means that it can be processed by software as well. For newly conducting the processing according to the present invention, it is therefore unnecessary to add hardware or some physical parts. Accordingly, types of products to which the present invention can be applied are wider and that is advantageous in cost.

The above correction makes it possible to increase quality of voice produced from PCM audio data sampled at lower sampling rates and/or quantized at lower bit rates. Accordingly, a very useful audio quality improvement technique can be provided for storing audio data into a semiconductor memory of which capacity for storage are limited to a certain amount or for delivering music through a network having a limitation in its transfer speed.

Furthermore, in addition to hi-fi audio, the present invention can be applied to a variety of replaying devices, such as a cellular phone, PHS, Internet phone, and semiconductor voice recorder, in which audio signals are handles at lower bit rates. This application is able to give improved articulation to replayed voice.

The audio signal processing for improving audio quality according to the present invention can be applied to non-compressed PCM (linear PCM) data, as has been described. This audio signal processing can therefore be used for data filed by any kind of format. Compressed PCM data are decoded, and then processed by this audio signal processing, while non-compressed PCM data are subjected to this audio signal processing without being decoded. Accordingly, properly adjusting parameters for weighting factors and a frequency bandwidth to be processed is able to provide the best audio-quality improvement that compensates for deterioration of audio quality. Files of non-compressed audio data include data files on the formats of MP3, WMA, AAC, RealAudio, and others, to which the audio signal processing of the present invention is applicable as well.

Second Embodiment

A second embodiment of the audio processing apparatus according to the present invention will now be described with reference to FIGS. 10 and 11.

This embodiment provides a configuration to which the function to improve audio quality according to the present invention can be added any time after acquisition of the apparatus.

Figure 10:
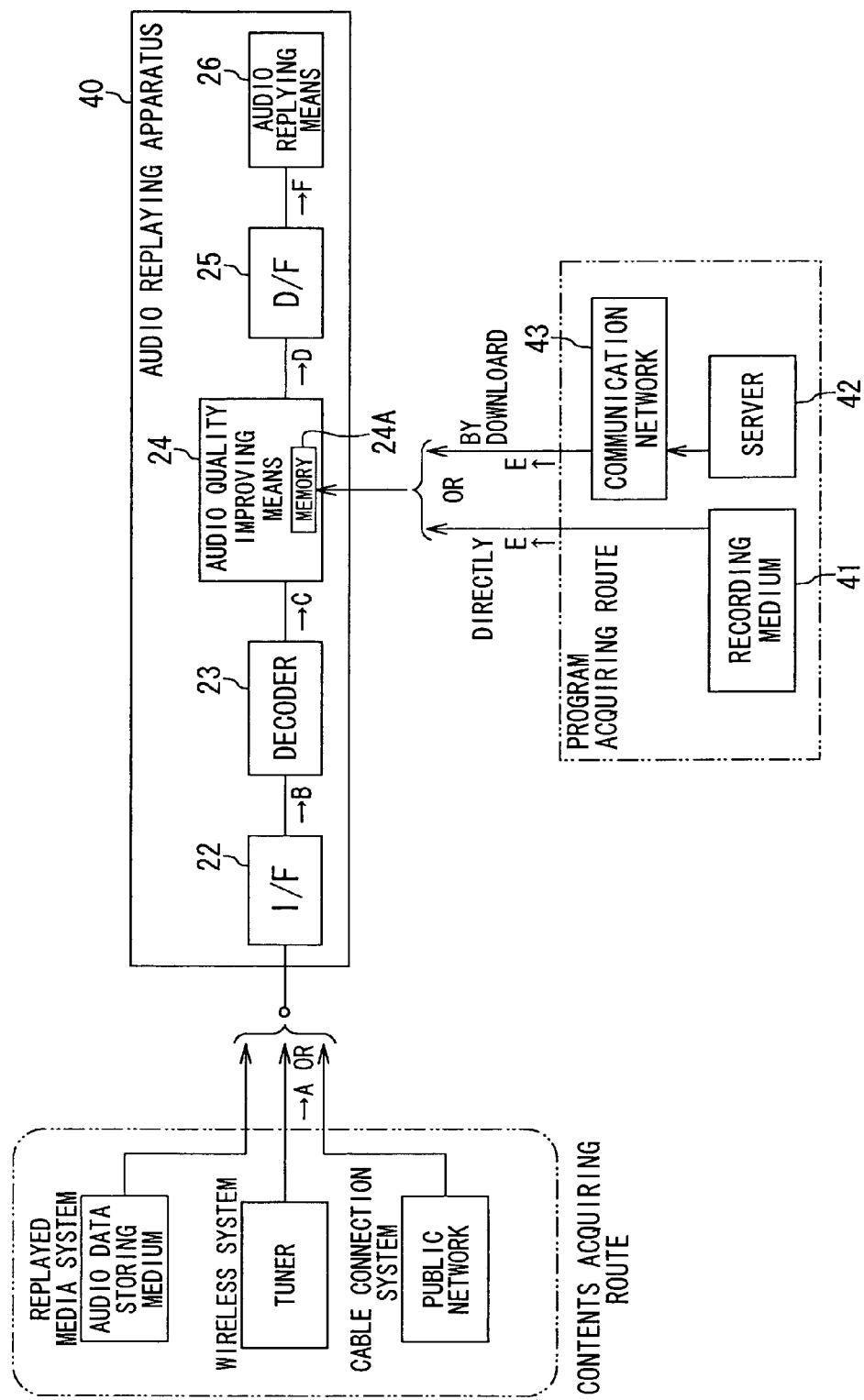
FIG. 10 outlines, together with paths to obtain contents and a program, an audio replaying apparatus according to a second embodiment of the present invention, in which an audio signal processing apparatus is functionally included.
Figure 11:
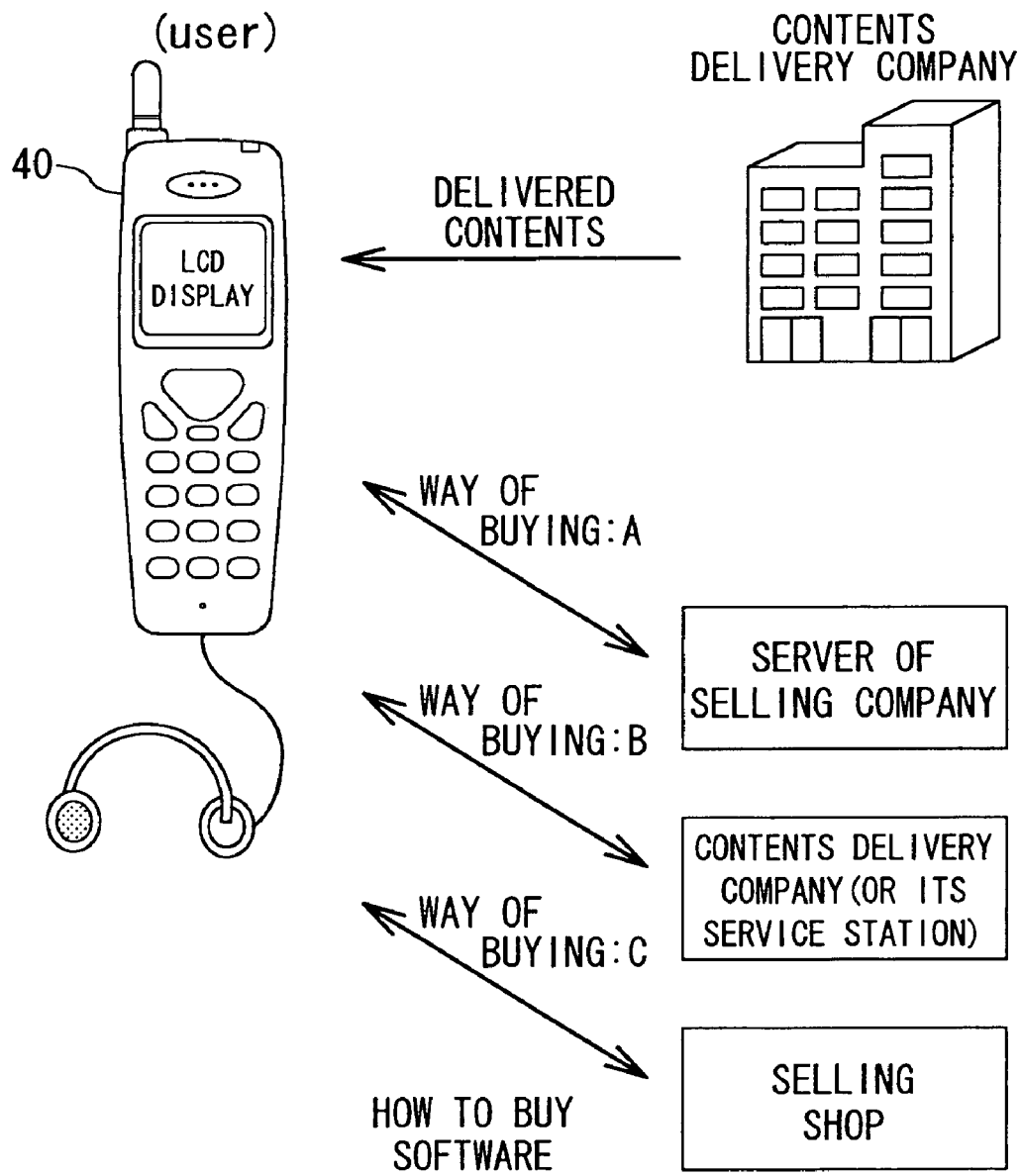
FIG. 11 illustrates how to buy software for improving audio quality in cases the audio replaying apparatus according to the second embodiment is a cellular phone.

A audio replaying apparatus shown in FIG. 10 is a cellular phone, for example, and has an interface 22, decoder 23, audio quality improving means 24, D/A converter 25, and audio replaying means 26, like the configuration shown in FIG. 2. The audio quality improving means 24 is functionally realized by the performance of a not-shown CPU, as described above. This CPU executes a program for audio quality improvement stored in a memory 24A (RAM or rewritable ROM), as shown in FIGS. 6 and 7, thus functionally providing the means 24.

As techniques for additionally installing the program for audio quality improvement into the memory 24A, the present embodiment provides a first way of directly providing the program and a second way of downloading via communication means, as shown in a program-acquiring route in FIG. 10 (refer to a reference E). In the former, a recording medium itself, such as an IC, disc, or magnetic tape, is connected directly or through an attachment to the memory 24A, thus the program being directly installed into the video quality improving means 24. On the other hand, in the latter case, a program for audio quality improvement preserved by a server 42 is downloaded via a wire or wireless communication network 43 into the memory 24A.

Accordingly, a function of audio quality improvement on software can additionally be provided to the audio replaying apparatus 40 in an easier fashion. Such ways of additional installation of the software are also effective in updating the program once installed. That is, as described above, it is enough that the recording medium 41 itself in which a version-up program is loaded is connected directly or via the communication network to the memory 24A for downloading. Of course, the function of the audio quality improvement can be added, as one standard function, previously before a shipment of the apparatus.

Further, to the interface 22 of the audio replaying apparatus 40, as shown by a contents acquiring route in FIG. 10, digital audio data (contents) to be replayed are given in various modes. These modes include audio data storing mediums (representing replayed media systems, such as CD, MD, and SOLID), tuners (representing wireless systems, such as radios and telephones), and public networks (representing cable connection systems, such as telephones and CATV).

A variety of digital audio data given through those various modes of systems (refer to a reference A in FIG. 10) differ in how to compress data and/or frame formats from each other, depending on which type of transmission system to be used. To overcome this difficulty, the interface 22 converts digital audio data into data of the same frame format at any time in cases there is a difference in the frame format (refer to a reference B in FIG. 10). The decoder 23 then decompresses digital audio data compressed based on various ways to convert them into decompressed data (refer to a reference C in FIG. 10). The decompressed digital audio data are then provided to the audio quality improving means 24, in which, as described before, the data undergoes the audio quality improvement processing based on the audio quality improvement program already stored in the memory 24A. The audio data, which has experienced the audio quality improvement processing, are then converted into an analog signal by the D/A converter 25, before being replayed by the audio replaying means 26.

In cases the audio replaying apparatus 40 is made up of a cellular phone, modes for adding a function will now be described by using FIG. 11, which requires to buy the audio quality improvement program (application software).

One way of buying (A) the software is electric commerce in which both of downloading the software and settling an account are carried out through a communication network between a user and a server of a selling company. A user selects a function of audio quality improvement in compliance with a menu displayed on the LCD display of the cellular phone 40, and if the selected function is charged, the user inputs settlement conditions on the LCD display. The selected and inputted information on the LCD display is sent via a communication network to the server of the selling company. Only when the settlement is allowed, its program data are downloaded through the communication network from the company's server, and then stored in the memory 24A. That is, buying the software and its settlement are carried out on line, it is not necessary for a user to go out anywhere in order to add the audio quality improving function to the user's cellular phone.

Another way of buying (B) the software is that a user goes, together with the user's cellular phone, to a contents delivery company or its service station and has the software written into the user's cellular phone through a wire connecting to a company's or station's system. In this case, an operation carried out at the company or service station is only writing the software, so the time necessary for the operation is reduced and the settlement is also completed thereat.

Still another way of buying (C) is applied to a selling mode in which the software is previously written in a recording medium such as a memory card. A user buys the recording medium at a selling shop and the recording medium is loaded or connected into or to the user's cellular phone, thus the software being installed thereinto. The function of audio quality improvement requires only additional writing of the software, simplifying the buying of the software.

The addition of the software for audio quality improvement through various buying ways allows the user's cellular phone 40 to replay voice of quality that is remarkably improved. The user selects desired contents of music or audio supplied by contents service companies, according to menus displayed on the cellular phone 40. In response to this selection, the specified contents can be acquired by means of radio waves. With the contents kept in information, only the audio of the contents is upgraded in quality.

Only needed to improve audio quality is to the simple operation of installing the software for the audio quality improvement. Thus, when the audio replaying apparatus itself has a function to be connectable to a network, the function for the audio quality improvement can easily be obtained by addition whenever it becomes necessary. It is therefore unnecessary for a contents delivery company to newly prepare a high-quality version of the same contents, being advantageous in cost through mass production of the same contents.

In the foregoing second embodiment, a wide variety of devices can be employed as the audio replaying apparatus. As described above, employing the cellular phone enables voice itself of talkers to be improved in quality, in addition to delivery service of voice-quality-improved music and voice. Namely, articulation of voice resulting from the current PDC (Personal Digital Cellular) system, which is not so satisfactory in hearing, can be improved. Further, a PDA (Personal Digtal Assistant), MD, digital voice recorder, semiconductor music player, digital camera, PC, and digital radio can also be adopted as the audio replaying apparatus.

The audio signal processing apparatus and the audio signal processing method, described so far, enable the analysis/prediction processing to be performed on PCM audio data deteriorated by data compression. This processing is therefore able to have the PCM audio data closely restored to original PCM data that were obtained before deterioration, providing higher-quality audio data that have been corrected.

It is possible that the analysis/prediction processing be realized by installing only the software, with no new hardware required, so that the audio signal processing apparatus and the audio signal processing method can be applied to a wide range of products.

Moreover, audio apparatuses that use audio signals at lower bit rates are able to have the advantage of improving articulation of voices to be replayed.

What is claimed is:

1. An audio signal processing apparatus in which a waveform of a digital audio signal to be replayed is processed, the apparatus comprising:
frequency bandwidth expanding means for expanding a frequency bandwidth of the digital audio signal through conversion of a sampling frequency at which the digital audio signal is sampled;
low-pass filtering means for performing low-pass filtering on the digital audio signal expanded in the frequency bandwidth, the low-pass filtering involving a cut-off frequency corresponding to the converted sampling frequency;

detecting means for detecting an interval of time between two adjacent waveform peaks of the low-pass-filtered digital audio signal, a polarity of a gradient of the waveform changing at each of the two adjacent waveform peaks and the interval of time being detected by measuring the number of times of sampling based on the converted sampling frequency;

difference data calculating means for calculating data of a difference between current data of the low-pass-filtered digital audio signal and past data of the low-pass-filtered digital audio signal;

weighting means for weighting the data of the difference depending on the interval of time between the two adjacent waveform peaks; and producing means for producing output data based on both the low-pass-filtered digital audio signal and the weighted data of the difference.

2. The audio signal processing apparatus of claim 1, wherein the past data of the low-pass-filtered digital audio signal used by the difference data calculating means are data sampled prior to sampling the current data by one sampling period of the converted sampling frequency.

3. The audio signal processing apparatus of claim 2, wherein the weighting means is configured to weight the difference data depending on both the interval of time and the polarities of the gradients.

4. The audio signal processing apparatus of claim 2, wherein the producing means is configured to add the weighted difference data to the low-pass-filtered digital audio signal.

5. The audio signal processing apparatus of claim 1, wherein the producing means adds the weighted difference data to the low-pass-filtered digital audio signal.

6. A method of processing a waveform of a digital audio signal to be replayed, comprising steps of:

expanding a frequency bandwidth of the digital audio signal through conversion of a sampling frequency at which the digital audio signal is sampled;

performing low-pass filtering on the digital audio signal expanded in the frequency bandwidth, the low-pass filtering involving a cut-off frequency corresponding to the converted sampling frequency;

detecting an interval of time between two adjacent waveform peaks of the low-pass-filtered digital audio signal, a polarity of a gradient of the waveform changing at each of the two adjacent waveform peaks and the interval of time being detected by measuring the number of times of sampling based on the converted sampling frequency;

calculating data of a difference between current data of the low-pass-filtered digital audio signal and past data of the low-pass-filtered digital audio signal;

weighting the data of the difference depending on the interval of time between the two adjacent waveform peaks; and producing output data based on both the low-pass-filtered digital audio signal and the weighted data of the difference.

7. The processing method of claim 6, wherein the past data of the low-pass-filtered digital audio signal are data sampled prior to sampling the current data by one sampling period of the converted sampling frequency.

8. The processing method of claim 7, wherein the weighting step weights the difference data depending on both the interval of time and the polarities of the gradients.

9. The processing method of claim 7, wherein the producing step adds the weighted difference data to the low-pass-filtered digital audio signal.

10. A computer-readable program stored in a computer readable medium and executed by a computer for processing a waveform of an inputted digital audio signal to be replayed, the program allowing the computer to functionally realize steps of:

expanding a frequency bandwidth of the digital audio signal through conversion of a sampling frequency at which the digital audio signal is sampled;

performing low-pass filtering on the digital audio signal expanded in the frequency bandwidth, the low-pass filtering involving a cut-off frequency corresponding to the converted sampling frequency;

detecting an interval of time between two adjacent waveform peaks of the low-pass-filtered digital audio signal, a polarity of a gradient of the waveform changing at each of the two adjacent waveform peaks and the interval of time being detected by measuring the number of times of sampling based on the converted sampling frequency;

calculating data of a difference between current data of the low-pass-filtered digital audio signal and past data of the low-pass-filtered digital audio signal;

weighting the data of the difference depending on the interval of time between the two adjacent waveform peaks; and producing output data based on both the low-pass-filtered digital audio signal and the weighted data of the difference.

11. The computer-readable program of claim 10, wherein the past data of the low-pass-filtered digital audio signal are data sampled prior to sampling the current data by one sampling period of the converted sampling frequency.

12. The computer-readable program of claim 11, wherein the weighting step weights the difference data depending on both the interval of time and the polarities of the gradients.

13. The computer-readable program of claim 11, wherein the producing step adds the weighted difference data to the low-pass-filtered digital audio signal.

* * * * *